United States Patent [19]

Foster et al.

[11] 4,454,236
[45] Jun. 12, 1984

[54] BELT TENSIONER AND METHOD OF MAKING SAME

[75] Inventors: Randy C. Foster, Springfield; Melvin D. Gayer, Everton, both of Mo.

[73] Assignee: Dayco Corporation, Dayton, Ohio

[21] Appl. No.: 281,154

[22] Filed: Jul. 7, 1981

[51] Int. Cl.³ .......................... F16H 7/12; F16H 7/08
[52] U.S. Cl. .................................. 474/135; 474/101; 474/110
[58] Field of Search .................. 474/22, 101, 103, 110, 474/133, 135, 138

[56] References Cited

U.S. PATENT DOCUMENTS

| | | | |
|---|---|---|---|
| 1,374,643 | 4/1921 | Fischbach | 474/138 |
| 2,130,995 | 9/1938 | Henney | 474/22 |
| 3,413,866 | 10/1966 | Ford | 474/138 |
| 3,599,506 | 8/1971 | Freese | 474/110 |
| 3,978,737 | 9/1976 | Bailey | 474/138 |
| 4,075,900 | 2/1978 | Hattendorf | 474/110 |
| 4,108,013 | 8/1978 | Sragal | 474/135 |
| 4,193,315 | 3/1980 | Noe | 474/135 |
| 4,249,425 | 2/1981 | Watson | 474/110 |
| 4,285,676 | 8/1981 | Kraft | 474/135 |
| 4,355,991 | 10/1982 | Kraft | 474/110 |

FOREIGN PATENT DOCUMENTS

| | | | |
|---|---|---|---|
| 56-76753 | 6/1981 | Japan | 474/138 |
| 664422 | 1/1952 | United Kingdom | 474/138 |
| 697171 | 9/1953 | United Kingdom | 474/110 |

*Primary Examiner*—Lawrence J. Staab
*Assistant Examiner*—Dwight G. Diehl
*Attorney, Agent, or Firm*—Joseph V. Tassone

[57] ABSTRACT

A tensioner for a power transmission belt which is adapted to be operated in an endless path and method of making same are provided and the tensioner comprises a rotatable idler pulley, a supporting assembly for rotatably supporting the pulley and urging same against the belt with a particular belt tensioning force with the assembly supported adjacent the belt, and a system for holding the assembly with the pulley urged against the belt, and wherein the holding system operates to lock the assembly at a fixed position immediately prior to moving the belt in its endless path and while the supporting assembly is applying the particular belt tensioning force to thereby determine a fixed center about which the pulley is rotated and the holding system operates to provide release of the assembly from the fixed position and hence the pulley from the fixed center only when the belt is stationary.

20 Claims, 5 Drawing Figures

BELT TENSIONER AND METHOD OF MAKING SAME

BACKGROUND OF THE INVENTION

1. Field of the Invention

This invention relates to a tensioner for an endless power transmission belt.

2. Prior Art Statement

In the art of transmitting power employing an endless polymeric power transmission belt, such as driving or rotating driven sheaves of a plurality of automobile accessories using a belt which is driven by a driving sheave connected to the automobile engine crankshaft, it is difficult to maintain such belt under the tension required to assure non-slipping engagement and driving of the driven sheaves; and, numerous belt tensioners have been proposed and used heretofore in an effort to provide the required tension. Especially where one of the accessories being driven is the compressor of an air conditioning system for the automobile, such compressor upon being driven creates a tight side and a slack side in the belt on opposite sides of the compressor sheave. The tight side has a varying tightness of a cyclic character as a function of the inherent cyclic change in the load imposed by the compressor. It is a problem to provide the required tension in the overall belt as well as prevent any tendency of the belt to oscillate in an undesirable manner as a result of this cyclic load change. Further, many tensioners employed heretofore had a tendency to oscillate together with the belt.

It is known in the art to provide a tensioner for a power transmission belt which is adapted to be operated in an endless path and with the tensioner comprising a rotatable idler pulley, a supporting assembly for rotatably supporting and urging the pulley against the belt with a particular belt tensioning force with the assembly supported adjacent the belt, and a system for holding the assembly with the pulley urged against the belt.

Examples of tensioners of the character mentioned are presented in the following items:

(1) U.S. Pat. No. 3,413,866
(2) U.S. Pat. No. 4,108,013
(3) U.S. Pat. No. 4,249,425.

It appears from item (1) above that a holding system for a belt tensioner is provided which comprises either a friction surface or a toothed surface and a spring is used to continuously urge an idler pulley against a belt in tensioning engagement resulting in a so-called "live" tensioner.

It appears from item (2) that a belt tensioner is provided wherein a wedge is employed and allows a lever arm which carries an idler pulley to move in one direction to maintain a constant tension on the belt while restricting movement of the lever arm in an opposite direction.

It appears from item (3) that a tensioning mechanism is provided which utilizes a vacuum motor to hold an idler pulley urged against a belt.

It is an object of this invention to provide an improved tensioner for an endless power transmission belt.

Another object of this invention is to provide a tensioner of the character mentioned which is controlled in part by the ambient temperature of the belt.

Another object of this invention is to provide an improved method of making a belt tensioner.

Other aspects, embodiments, objects, and advantages of this invention will become apparent from the following specification, claims, and drawings.

SUMMARY

In accordance with the present invention there is provided an improved tensioner for a power transmission belt, and method of making same, wherein the tensioner is adapted to be operated in an endless path and the tensioner comprises a rotatable idler pulley, a supporting assembly for rotatably supporting the pulley and urging such pulley against the belt with a particular belt tensioning force with the assembly supported adjacent the belt, and a system for holding the assembly with the pulley urged against the belt.

In accordance with one embodiment of this invention the holding system operates to lock the assembly at a fixed position immediately prior to moving the belt in its endless path and while the supporting assembly is applying the particular belt tensioning force to thereby determine a fixed center about which the pulley is rotated and the holding system operates to provide release of the assembly from the fixed position and hence the pulley from the fixed center only when the belt is stationary.

BRIEF DESCRIPTION OF THE DRAWINGS

The accompanying drawings show present preferred embodiments of this invention, in which.

DETAILED DESCRIPTION

Figure 1:
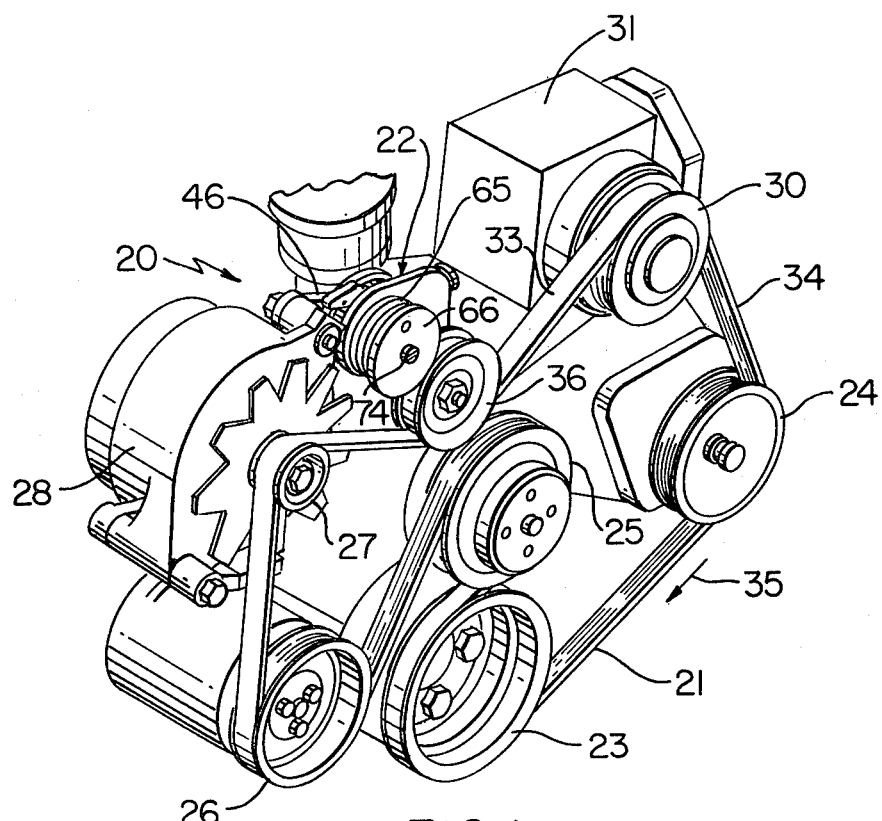
FIG. 1 is a fragmentary isometric view looking toward the front end of an automobile engine which utilizes one exemplary embodiment of the belt tensioner of this invention which is used to tension a belt employed in driving a plurality of accessories.

Reference is now made to FIG. 1 of the drawings which is an isometric view of the front end portion of a motor vehicle engine, shown as an automobile engine, which is designated generally by the reference numeral 20; and, such engine utilizes an endless power transmission belt 21 for driving a plurality of driven accessories, as will be described subsequently, and a tensioner 22 for the belt 21. The tensioner provides an automatic tensioning function yet operates with its idler pulley at a fixed center during operation of the belt 21.

The endless power transmission belt 21 may be of any suitable type known in the art and is preferably made primarily of polymeric material; and, the tensioner 22 of this invention makes it possible to operate a belt 21 having a polyester load-carrying cord in an efficient manner and as will be described subsequently.

The belt 21 is driven by a driving sheave 23 which is operatively connected to the engine 20; and, in particular to the crankshaft of such engine, as is known in the art. The driving sheave 23 drives the belt 21 and thereby drives a sheave 24 of a power steering device used in an automobile (not shown) employing the engine 20, a sheave 26 comprising an air pump of a type used in an antipollution system for the engine 20, a sheave 27 comprising an electrical unit such as an engine alternator 28, and a sheave 30 comprising a compressor 31 of an air conditioning system for the automobile employing the engine 20.

All of the driven accessories, through their sheaves, impose a load on the belt 21; however, the detailed description will proceed with the load imposed by the compressor 31 and its sheave, inasmuch as such load is generally of comparatively high magnitude. Accordingly, the compressor 31, upon being driven, creates a slack side 33 and a tight side 34 in the belt 21 upon turning on the air conditioning system in the automobile; and, such slack side 33 and tight side 34 are produced inasmuch as the belt is rotating clock-wise as indicated by the arrow 35 in FIG. 1.

The belt tight side 34 (and hence slack side 33) varies in tightness, i.e., magnitude of tightness, in a cyclic manner and as a function of the inherent cyclic change in the load imposed by the air compressor 31. This cyclic change in load varies between greater extremes in applications where the compressor 31 is of a piston type. The cyclic load imposed by the compressor 31 has a tendency to cause the slack side 33 of the belt 21 to vibrate or oscillate. However, the tensioner 22 of this invention provides not only a belt tensioning function but also serves to reduce belt oscillation by providing a locked fixed center for the idler pulley of the tensioner once the belt is moved or operated.

Figure 2:
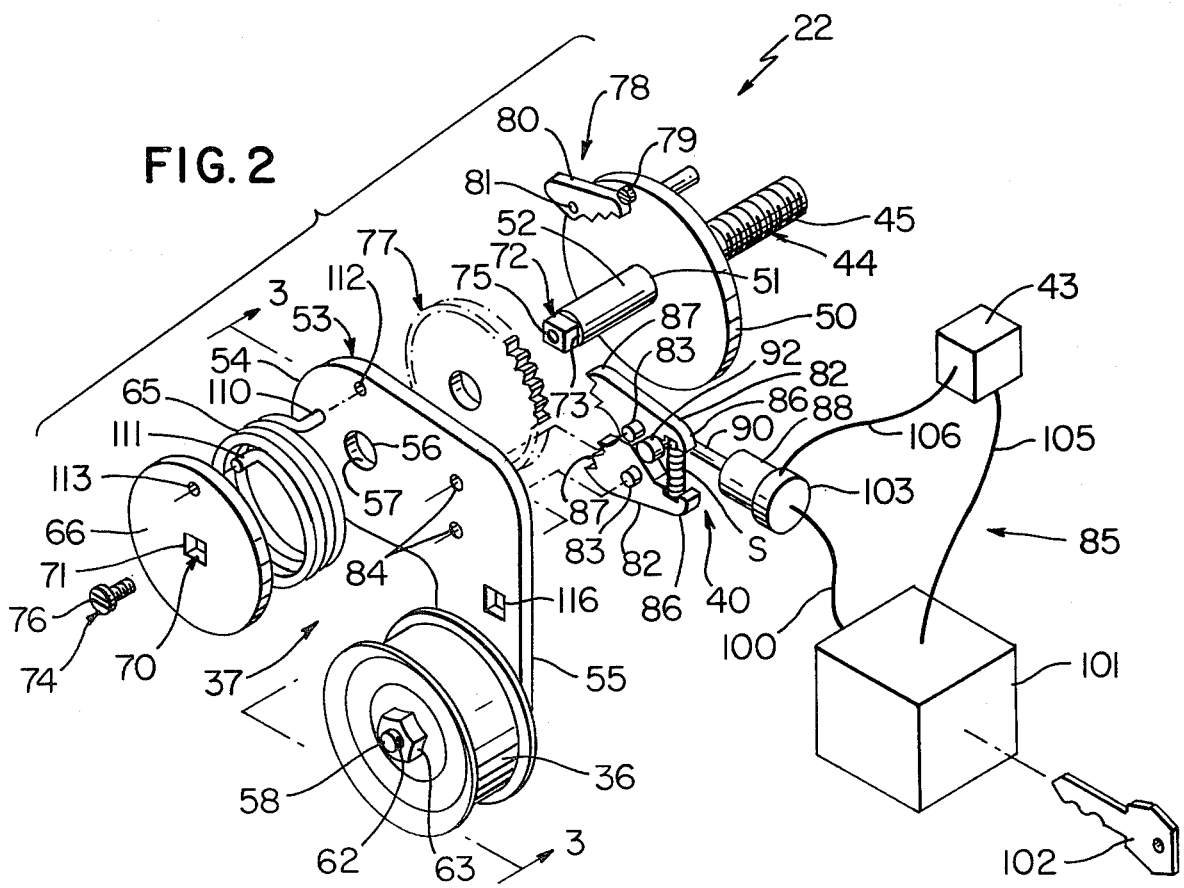
FIG. 2 is an exploded isometric view of the tensioner of FIG. 1 with certain parts shown schematically.

As best seen in FIG. 2 of the drawings the tensioner 22 comprises a rotatable idler pulley 36 and a supporting assembly 37 for rotatably supporting and urging the pulley 36 against the belt 21 with a particular belt tensioning force with the assembly supported adjacent the belt. The tensioner 22 also comprises a system, designated generally by the reference numeral 40, for holding the assembly 37 with the pulley 36 urged against the belt 21; and, such system 40 will be described in detail subsequently. However, basically the system 40 operates to lock the assembly 37 at a fixed position, which is illustrated at 41 in FIG. 3, immediately prior to moving the belt 21 in its endless path and while the supporting assembly 37 is applying the particular belt tensioning force to thereby determine a fixed center 42 about which the pulley 36 is rotated; and, the holding system 40 also operates to provide release of the assembly 37 from the fixed position 41 and hence release the pulley 36 from the fixed center 42 only under conditions when the belt is stationary, i.e., the engine 20 is not running, whereby the driving sheave 23 is not rotating the belt 21 in its endless path.

The tensioner 22 also comprises a temperature responsive device 43 which is operatively connected to and operates to control release of the assembly 37 from its fixed position 41 only when the belt is stationary as previously mentioned and with the additional parameter of when the ambient temperature of the belt 21 is below a given value.

The tensioner 22 provides especially efficient operation when employed on an automobile engine having an air conditioner compressor of the character previously mentioned associated therewith and which uses a belt 21 having a load-carrying cord made of polyester material, and as mentioned earlier. With a belt having a load-carrying cord made of polyester material there is a tendency for the belt to shrink slighting in effective length as the air temperature of the engine compartment and hence the ambient temperature of the belt increases. The tensioner 22 of this invention assures that the belt 21 operates about fixed center sheaves during belt operation and uses the inherent shrinkage character of the belt to provide efficient and controlled belt self-tightening which assures minimum oscillation. Further, the temperature responsive device 43 operates such that it cooperates with other components of system 40 to control the release of the assembly 37 from its locked position when the belt is below a given temperature value, e.g., 110° F. in one application, and as will be explained in more detail subsequently. By tensioning the belt 21 with the tensioner 22 only after its ambient temperature is below 110° F., the belt is in a stable condition and is thus not subjected to belt stretching forces which might otherwise be created by the joint action of belt temperature and the tensioner 22.

The tensioner 22 comprises a support shaft 44 having means for supporting same and hence the entire assembly 37 adjacent the belt 21. The support shaft 44 has a threaded inner end 45 which is particularly adapted to be threadedly received in a threaded opening provided in a member 46 comprising the engine 20; and, the inner end 45 is suitably threaded in position using any technique known in the art.

The assembly 37 also comprises a support plate 50 which is fixed to the support shaft 44. The support plate 50 has a central opening therein which is adapted to receive the shaft 44 therethrough whereupon the plate 50 is fixed to the shaft by suitable fixing means which may be in the form of a metal weld 51. The shaft 44 is constructed so that it has a right circular cylindrical outer portion 52 which extends outwardly of the support plate 50.

The assembly 37 also comprises a bracket 53 which has an inner end 54 suitably supported on the shaft 44 and an outer end 55 which rotatably supports the idler pulley 36. In this example, the bracket 53 is a substantially L-shaped bracket which has an opening 56 in the inner end portion 54 thereof which defines cylindrical inside surface means 57. The bracket 53 is disposed in position with the outer portion 52 of the shaft 44 extending through opening 56 and thereby pivotally supporting the bracket 53 through the action of cylindrical surface 57 pivotally engaging the shaft portion 52.

As mentioned earlier, the idler pulley 36 is supported on the outer end 55 of the bracket 53. In particular, the idler pulley 36 is supported on outer end 55 by a special shaft 58 (FIG. 3) which extends through a pair of cooperating equal-size and aligned openings in the pulley 36 and the outer end 55 with such aligned openings being designated by the same reference numeral 60. The shaft 58 has a head 61 which engages the inside surface of the bracket 53, a plain central part which serves as a stationary axle about which the pulley 36 rotates, and a threaded outer end 62, as seen in FIG. 2. A threaded nut 63 is provided for holding the shaft 58 and pulley 36 in position on the outer end 55 of the bracket 53 by threadedly fastening such nut 63 over the threaded outer end 62, yet the pulley 36 is free to rotate on the shaft 58.

The assembly 37 also comprises spring means, which is designated generally by the reference numeral 65, acting between the shaft 44 and the bracket 53 to thereby pivot such bracket about the shaft 44 and thus (with the tensioner installed in its tensioning position)

simultaneously urge the pulley against the belt 21 with a particular belt tensioning force determined by the spring means 65. The spring means 65 of this example is a torsion spring 65 which serves to urge the pulley 36 against the belt with the previously-mentioned belt tensioning force and such force has a magnitude defined by the characteristics of the torsion spring 65. Also, during initial installation of the tensioner 22 on the engine 20 this magnitude of the tensioning force may, in essence, be controlled within the characteristics of the spring by correlating the preloading of such spring 65 and the actual position of the pulley 36.

The assembly 37 also comprises a disc 66 and means attaching such disc to the shaft 44 and such attaching means comprises a polygonal inside surface means 70 defining an opening 71 in the disc and corresponding polygonal outside surface means 72 defining the terminal outer end of the end portion 52 of the shaft 44. The polygonal outside surface means 72 is adapted to be received within and in close fitting engagement against the inside surface means 70 to prevent relative rotation between the disc 66 and the shaft 44; and, it will be seen that in this example the surface means 70 and 72 are of square cross-sectional outline. The attaching means further comprises means fixing the terminal outer end of the shaft 44 to the disc 66 to prevent relative axial movement therebetween and such fixing means in this example of the invention comprises a shoulder 73 adjoining the inner end of the surface means 72 which prevents inward axial movement of the disc 66 toward the plate 50 and a threaded bolt 74 which is received within a threaded opening 75 in the shaft 44 and has a head 76 which prevents outward movement of the disc 66.

The holding system 40 operates essentially as previously described and comprises a toothed wheel 77 which is supported concentrically around the shaft 44 and against the plate 50. The system 40 also comprises connecting means 78 for preventing relative rotation between the wheel 77 and the plate 50, and hence shaft 44; and, such connecting means in this example of the invention comprises a pivotally mounted toothed pawl 80. The pawl 80 is pivotally supported by a pivot pin 81 and in some applications such pawl 80 may be spring urged by spring means (not shown) with its teeth into toothed engagement with the teeth of wheel 77 to prevent relative rotation between the shaft 44 and the toothed wheel 77. In this example, the pawl 80 is held in toothed engagement with the teeth of wheel 77 by a readily installed and removed metal fastening screw 79. It will also be appreciated that the toothed wheel is confined against axial movements, once the tensioner 22 is in assembled relation, by the adjacent facing surfaces of the support plate 50 and the bracket 53.

The holding system 40 also comprises pawl means supported by the bracket 53 and in this example of the invention such pawl means is defined as a pair of toothed pawls 82. Each pawl is pivotally supported by a pivot pin 83 which is suitably fixed to the bracket 53 upon extending same through an associated opening 84 in such bracket. Each pivot pin 83 has a head portion (not shown) which prevents its pawl 82 from moving axially away from the inside surface of the bracket 53.

Figure 3:
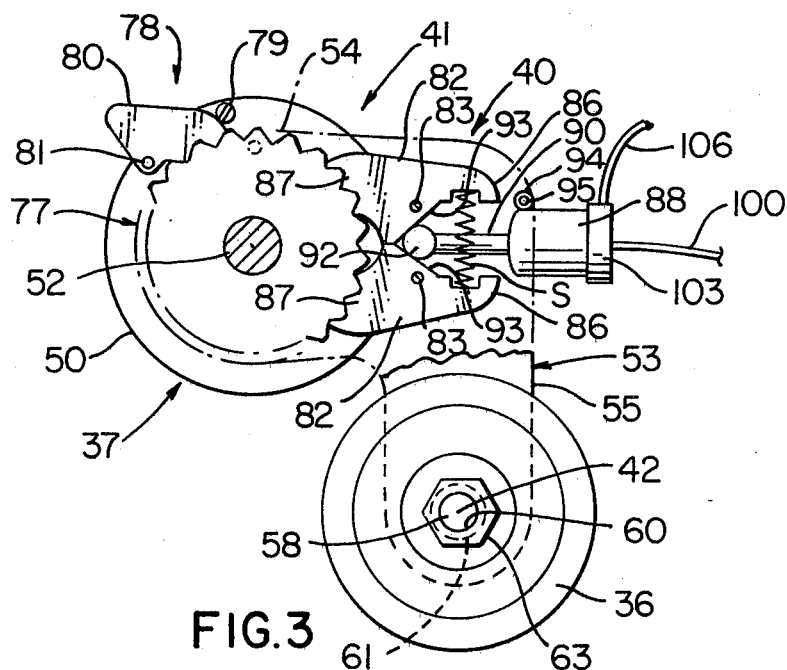
FIG. 3 is a view taken approximately on line 3—3 of FIG. 2 once the tensioner is assembled and engaging the belt during normal operation thereof in its endless path, whereby the tensioner idler pulley is operating about a fixed center.

The holding system 40 also comprises actuating means 85 for the pawl means or pawls 82. The actuating means comprises a compression spring S acting between the outer ends 86 of the pawls 82 and the spring S operates to move the toothed inner ends 87 of such pawls toward each other and against the teeth of the wheel 77. The actuating means 85 also comprises a solenoid actuator 88 which has a telescoping actuating stem 90 extending outwardly therefrom and the stem 90 has a cylindrical cam member 92 attached to the terminal end of the stem 90, as best seen in FIG. 3. The cam member 92 is adapted to engage cam surfaces 93 on the pawls 82 to override the compression spring S and move the inner ends 87 of the pawls away from the toothed wheel 77. It will also be seen that the solenoid actuator 88 is pivotally supported on the bracket 53 by a headed supporting pin 95 which extends through a suitable opening in a boss 94 provided on the actuator 88.

The actuating means 85 also comprises an electrical conductor assembly 100 which is operatively connected to an electrical system 101, which comprises a portion of the system used by the vehicle employing the engine or driving means 20. Suitable circuitry is provided in the system 101, as is known in the art, such that once a key for actuator means 102 used to start the engine is turned on, and electrical signal is provided from the system 101 through the electrical conductor assembly 100 to a control portion 103 of the solenoid actuator 88. The soleniod actuator 88, under these conditions, retracts its stem 90 allowing the compression spring S to move the end portions 87 of the pawls 82 into engagement with the toothed wheel 77 to lock the assembly 37 as shown in FIG. 3.

It will be appreciated that this locking action is achieved before the automobile engine 20 is actually started and hence is achieved immediately prior to moving the driving sheave 23 and thus the belt 21 in its endless path. In essence, the holding system 40 through the action of its actuating means 85 locks the bracket 53 to the shaft 44 whereby the entire assembly 37 is locked at a fixed position to thereby simultaneously define a fixed center 42 about which the idler pulley 36 is rotatable.

It should also be emphasized that the solenoid actuator 88 is of a special type. In particular, the control portion 103 of such actuator 88 is such that the actuator stem 90 is kept retracted until the ignition key 102 is turned off, at which time the belt 21 is stationary. Once the ignition key is turned off, electrical power is supplied through another part of the assembly 100 to extend the stem 90, if a suitable temperature signal is provided to the control portion 103 from the temperature responsive device 43 and as will now be explained.

Figure 4:
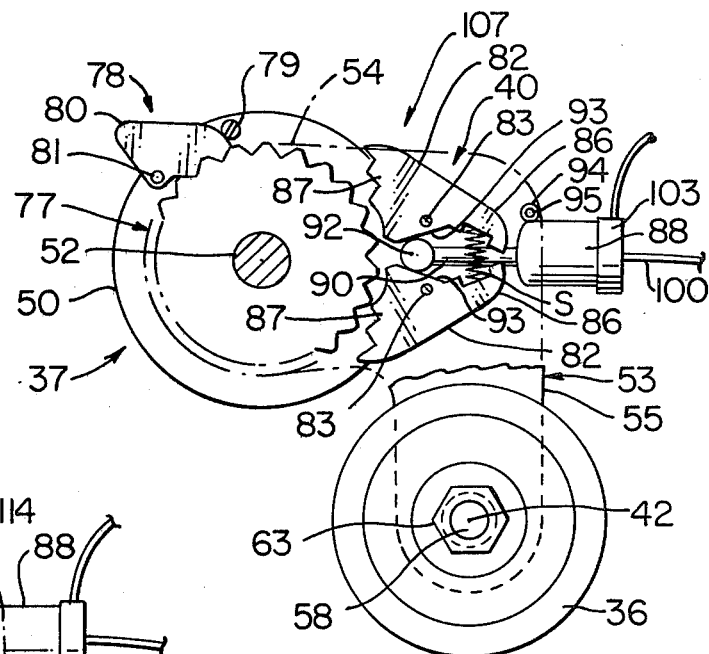
FIG. 4 is a view similar to FIG. 3 illustrating the manner in which the idler pulley of the tensioner is released from the fixed position of FIG. 3 when the belt is stationary.

In particular, the temperature responsive device 43 may be provided with electrical power from any suitable source; and, in this example is provided with power from the system 101 by a lead assembly 105. The device 43 is in turn operatively connected to the control portion 103 of the solenoid actuator 88 through a lead assembly 106. The device 43 may comprise a bimetallic element, or the like, and operates to provide an electrical signal to the control portion 103 once the ambient temperature of the belt drops below a predetermined level, such as 110° F. The cooperating action of the electrical signal provided due to the key 102 being off and the ambient temperature being below 110° F. results in the control portion 103 energizing solenoid actuator 88 causing it to extend its stem 90 to thereby cause the cylindrical actuating head 92 to be urged against the cam surfaces 93. This action causes the compression spring S to be overridden as shown in FIG. 4 whereby the toothed inner ends 87 of the pawls 82 are moved away from the teeth of the toothed wheel 77 and as illustrated at 107. Once the toothed inner ends 87 are moved away, the bracket 53 is released from the shaft 44 and the idler pulley 36 is released so that it no longer is at a fixed center 42.

Once the above actions take place, the torsion spring 65 is free to urge the bracket 53 toward the belt 21 and thereby urge the pulley 36 in belt-tensioning engagement against the belt 21. It will be appreciated that the torsion spring 65 has bent opposite ends 110 and 111 which are suitably fixed within respective openings 112 and 113 in the bracket 53 and the disc 66 respectively which enables the spring to exert its tensioning function.

The operation of the holding system may be summarized as follows. Immediately upon turning the key 102 to start the engine 20 (before the starter of the engine 20 has an opportunity to be energized) the electrical power is supplied to the solenoid actuator 88 resulting in the actuating stem 90 being retracted and held in the position illustrated in FIG. 3. The pawls 82 are immediately urged by the compression spring S so as to lock the toothed wheel 77 in position and thereby lock the tensioner so that its idler pulley rotates about a fixed center 42. At this point, the tensioning system has all sheaves or pulleys (23, 24, 25, 26, 27, 30, and 36) associated therewith operating about fixed centers whereby the tensioning system is free of the type of belt oscillations which are common in a system where a tensioner is continuously yieldingly urged against its belt. Similarly, any oscillations of the type caused by a compressor, such as compressor 31, of an air conditioning system are minimized.

As the engine continues to be operated, the temperature in the engine compartment increases whereby the ambient temperature of the belt 21 also increases. In applications where the belt 21 has a load-carrying cord made of polyester, or the like, there is a tendency for the increased belt ambient temperature to cause the belt to shrink. This belt shrinkage provides an automatic controlled self-tightening and while the belt is moving about pulleys having fixed centers.

Once the engine 20 is shut down, a first electrical signal is provided to the solenoid actuator control 103 due to the ignition being turned off. This first signal is not operative until and unless the temperature sensed by the device 43 is below 110° F. Once the temperature is below 110° F., the device provides a second electrical signal to the control 103. The joint action of the first and second electrical signals to the control 103 causes such control to energize the solenoid actuator 88 and extend its stem 90 to thereby release the bracket 53 and idler pulley 36 allowing such pulley to be yieldingly urged against the belt 21. In essence, this provides a retensioning of the belt and any slackness that may have been introduced therein due to wear, belt stretch, or the like, is automatically taken up. Nevertheless, once the engine 20 is started again a fixed center system is again instantaneously provided, as described above.

The tensioner 22 also comprises means on the L-shaped bracket enabling lifting thereof and of the idler pulley 36 carried thereby against the action of the torsion spring 65 to facilitate moving the pulley 36 away from the belt 21 and thereby enable installation and removal of such belt from its endless path. Although the means enabling lifting may be any suitable means, in this example a rectangular opening 116 is provided in the bracket and such opening is adapted to receive a special tool (not shown) therewithin for lifting purposes. The tool may be an L-shaped bar having an end of rectangular cross section which is sized to be received within the opening 116.

Figure 5:
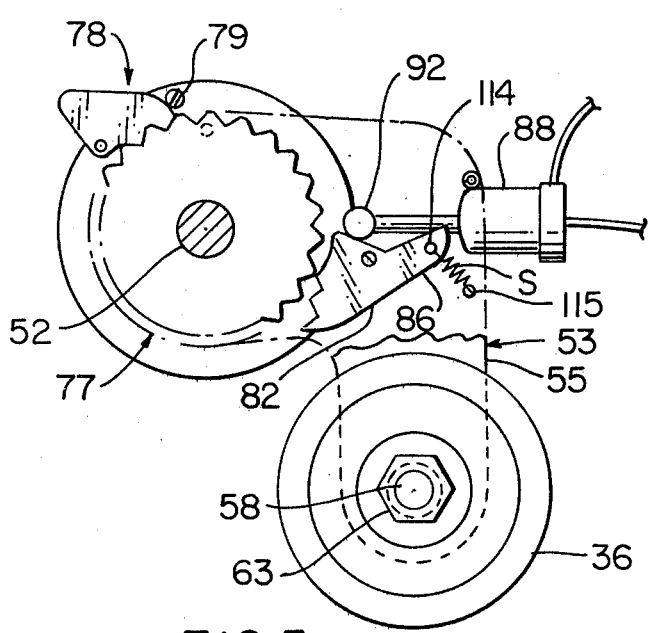
FIG. 5 is a view similar to FIG. 4 illustrating a modification of the tensioner of FIG. 3.

Having described the tensioner 22 of this invention, reference is now made to FIG. 5 of the drawings which illustrates a modification of such tensioner. The tensioner of FIG. 5 is identical to the tensioner 22, previously described, except for the holding system. In particular, instead of providing pawl means consisting of a pair of pawls, each pivotally supported about an associated pin, a single pawl also designated by the reference numeral 82 is provided and pivoted about an associated pivot pin which is similar to the pivot pin 83. Also, instead of using a compression spring to hold the pawl 82 against the toothed wheel 77 during normal belt operation, a tension spring (also designated by the reference letter S) is used for this purpose. The tension spring S acts between a pivot pin 115 fixed to the bracket 53 and a similar pivot pin 114 fixed to the end 86 of the pawl 82. In all other aspects the modified tensioner of FIG. 5 operates as described previously for the tensioner 22 of FIGS. 1–4.

While present exemplary embodiments of this invention, and methods of practicing the same, have been illustrated and described, it will be recognized that this invention may be otherwise variously embodied and practiced within the scope of the following claims.

What is claimed is:

1. In a tensioner for a power transmission belt which is adapted to be operated in an endless path by a driving means, said tensioner comprising, a rotatable idler pulley, a supporting assembly for rotatably supporting said pulley and urging said pulley against said belt with a particular belt tensioning force with said assembly supported adjacent said belt, and a system for holding said assembly with said pulley urged against said belt, the improvement wherein said holding system comprises actuator means for operating said driving means so as to cause said belt to be moving in said endless path, said actuator means having means that causes said system to first automatically lock said assembly at a fixed position immediately prior to said actuator means causing said belt to be moved in said endless path and while said supporting assembly is applying said particular belt tensioning force to thereby determine a fixed center about which said pulley is rotated, said holding system being adapted to provide release of said assembly from said fixed position and hence said pulley from said fixed center only when said actuator means causes said belt to be stationary.

2. A tensioner as set forth in claim 1 in which said holding system comprises a temperature responsive device which operates to control release of said assembly from said fixed position only when said belt is stationary and the ambient temperature of said belt is below a given value.

3. In a tensioner for a power transmission belt which is adapted to be operated in an endless path, said tensioner comprising, a rotatable idler pulley, a supporting assembly for rotatably supporting said pulley and urging said pulley against said belt with a particular belt tensioning force with said assembly supported adjacent said belt, and a system for holding said assembly with said pulley urged against said belt, the improvement wherein said holding system operates to lock said assembly at a fixed position immediately prior to moving said belt in said endless path and while said supporting assembly is applying said particular belt tensioning force to thereby determine a fixed center about which said pulley is rotated and said holding system operates to provide release of said assembly from said fixed position and hence said pulley from said fixed center only when said belt is stationary, said holding system comprising a temperature responsive device which oprates to control release of said assembly from said fixed position only when said belt is stationary and the ambient temperature of said belt is below a given value, said assembly comprising a support shaft having means for supporting same and hence said assembly adjacent said belt, a support plate fixed to said support shaft, a bracket having an inner end pivotally supported on said shaft and having an outer end which rotatably supports said idler pulley, and spring means acting between said shaft and said bracket to pivot said bracket about said shaft and simultaneously urge said pulley against said belt with said particular belt tensioning force.

4. A tensioner as set forth in claim 3 in which said spring means comprises a mechanical torsion spring acting between said shaft and bracket.

5. A tensioner as set forth in claim 4 in which said bracket comprises a substantially L-shaped bracket and further comprising means on said bracket enabling lifting thereof and of the pulley carried thereby against the action of said torsion spring to facilitate moving said pulley away from said belt and thereby enable installation and removal of said belt from its endless path.

6. A tensioner as set forth in claim 5 in which said means enabling lifting comprises a rectangular opening in said bracket which is adapted to receive a special tool therewithin for lifting purposes.

7. A tensioner as set forth in claim 4 in which said assembly further comprises a disc and means attaching said disc to said shaft, said torsion spring having one end connected to said disc and its opposite end connected to said bracket.

8. A tensioner as set forth in claim 7 in which said attaching means comprises a polygonal inside surface means defining an opening in said disc and corresponding polygonal outside surface means defining the terminal outer end of said shaft, said polygonal outside surface means being adapted to be received within and in close fitting engagement againt said inside surface means to prevent relative rotation between said disc and shaft.

9. A tensioner as set forth in claim 8 in which said polygonal surface means are of square cross-sectional outline.

10. A tensioner as set forth in claim 8 in which said attaching means further comprises means fixing the terminal outer end of said shaft to said disc to prevent relative axial movement therebetween, said fixing means comprising a shoulder on said shaft which prevents axial movement of said disc in one direction and a threaded bolt which is threadedly received within a threaded opening in said shaft and has a head which prevents axial movement of said plate in a direction opposite from said one direction.

11. A tensioner as set forth in claim 3 in which said holding system comprises a toothed wheel supported concentrically around said shaft, connecting means for preventing relative rotation between said wheel and shaft, pawl means supported by said bracket, and actuating means for said pawl means, said actuating means operating to move said pawl means into engagement with said teeth on said wheel immediately prior to moving said belt in said endless path to lock said bracket to said shaft and thereby hold said pulley at said fixed center, said actuating means operating to release said pawl means once said belt is stationary and a signal from said temperature responsive means indicates the ambient temperature of said belt is below a given value.

12. A tensioner as set forth in claim 11 in which said actuating means comprises a mechanical spring for moving said pawls into engagement with said teeth and an electrical solenoid actuator for engaging said pawl means to override said mechanical spring to release said pawl means once said belt is stationary and said signal from said temperature responsive means indicates the ambient temperature of said belt is below a given value.

13. A tensioner as set forth in claim 12 in which said pawl means comprises a pair of cooperating pawls.

14. A tensioner as set forth in claim 12 in which said pawl means comprises a single pawl.

15. A tensioner as set forth in claim 11 in which said connecting means for preventing relative rotation between said wheel and shaft comprises a pivotally mounted toothed pawl.

16. In a method of making a tensioner for a power transmission belt which is adapted to be operated in an endless path by a driving means, said method comprising the steps of, providing a rotatable idler pulley, providing a supporting assembly for rotatably supporting said pulley and urging said pulley against said belt with a particular belt tensioning force and with said assembly supported adjacent said belt, and providing a system for holding said assembly with said pulley urged against said belt, the improvement wherein said step of providing said holding system comprises providing a holding system which comprises actuator means for operating said driving means so as to cause said belt to be moving in said endless path and having means that causes said system to first automatically lock said assembly at a fixed position immediately prior to said actuator means being adapted to cause moving of said belt in said endless path and while said supporting assembly is applying said particular belt tensioning force to thereby determine a fixed center about which said pulley is rotated, said step of providing causing said holding system to be adapted to provide release of said assembly from said fixed position and hence said pulley from said fixed center only when said actuator means causes said belt to be stationary.

17. A method as set forth in claim 16 in which said step of providing said holding system comprises the step of forming said system to comprise a temperature responsive device that operates to control release of said assembly from said fixed position only when said belt is stationary and the ambient temperature of said belt is below a given value.

18. In a method of making a tensioner for a power transmission belt which is adapted to be operated in an endless path, said method comprising the steps of, providing a rotatable idler pulley, providing a supporting assembly for rotatably supporting said pulley and urging said pulley against said belt with a particular belt tensioning force and with said assembly supported adjacent said belt, and providing a system for holding said assembly with said pulley urged against said belt, the improvement wherein said step of providing said holding system comprises providing a holding system which operates to lock said assembly at a fixed position immediately prior to moving said belt in said endless path and while said supporting assembly is applying said particular belt tensioning force to thereby determine a fixed center about which said pulley is rotated and said holding system operates to provide release of said assembly from said fixed position and hence said pulley from said fixed center only when said belt is stationary, said step of providing said holding system comprising operatively connecting a temperature responsive device to said holding system wherein said device operates to control release of said assembly from said fixed position only when said belt is stationary and the ambient temperature of said belt is below a given value, said step of providing said assembly comprising the steps of providing a support shaft having means for supporting same and hence said assembly adjacent said belt, fixing a support plate to said support shaft, pivotally supporting an inner end of a bracket on said shaft, rotatably supporting said idler pulley on an outer end of said bracket, and disposing spring means between said shaft and said bracket to pivot said bracket about said shaft and simultaneously urge said pulley against said belt with said particular belt tensioning force.

19. A method as set forth in claim 18 in which said disposing step comprises, disposing a mechanical torsion spring between said shaft and bracket.

20. A method as set forth in claim 19 in which said step of providing said holding system comprises supporting a toothed wheel concentrically around said shaft, connecting said wheel and shaft to prevent relative rotation therebetween, supporting pawl means on said bracket, and supplying actuating means for said pawl means, said actuating means operating to move said pawl means into engagement with said teeth on said wheel immediately prior to moving said belt in said endless path to lock said bracket to said shaft and thereby hold said pulley at said fixed position, said actuating means operating to release said pawl means once said belt is stationary and a signal from said temperature responsive means indicates the ambient temperature of said belt is below a given value.

* * * * *